United States Patent [19]

Walther et al.

[11]  4,187,733
[45]  Feb. 12, 1980

[54] SPEED REDUCTION MECHANISM FOR SEMI-TRAILER LANDING GEAR

[75] Inventors: William D. Walther, Kettering; Charles E. Phillips, Bryan, both of Ohio

[73] Assignee: Dayton-Walther Corporation, Dayton, Ohio

[21] Appl. No.: 910,832

[22] Filed: May 30, 1978

[51] Int. Cl.² ............................ F16H 3/22; B60S 9/04
[52] U.S. Cl. .................................... 74/342; 254/86 R
[58] Field of Search ................ 74/342, 332, 344, 414, 74/475, 578; 254/86 R, 86 H

[56] References Cited

U.S. PATENT DOCUMENTS

| | | | |
|---|---|---|---|
| 2,747,422 | 5/1956 | Walther | 254/86 R X |
| 3,010,699 | 11/1961 | McKay | 74/578 X |
| 3,632,086 | 1/1972 | Mai | 254/86 R |
| 3,892,141 | 7/1975 | Phillips, Jr. et al. | 74/475 |

Primary Examiner—Peter Nerbun

Attorney, Agent, or Firm—Biebel, French & Nauman

[57] ABSTRACT

A semi-trailer landing gear speed reduction mechanism is provided which includes two horizontally disposed parallel spaced shafts with one shaft being rotated by a manual crank means and the other shaft connected to a mechanism for raising and lowering the landing gear. A two speed ratio for the mechanism is provided by having a fixed pair of gears secured to the driven shaft, a pinion gear fixed to the driving shaft and a gear having both internal and external threads supported on its internal threads on the driving shaft and in engagement with a pinion gear on the driven shaft. The drive shaft is axially shiftable between a first position in which the last said gear is free to rotate about the driving shaft and the pinion gear secured to the driving shaft is in driving engagement with a gear on the driven shaft, and a position in which the pinion gear on the driving shaft is in engagement with the internal threads on the floating gear which in turn drivingly engages with its external threads the pinion gear secured to the driven shaft.

5 Claims, 5 Drawing Figures

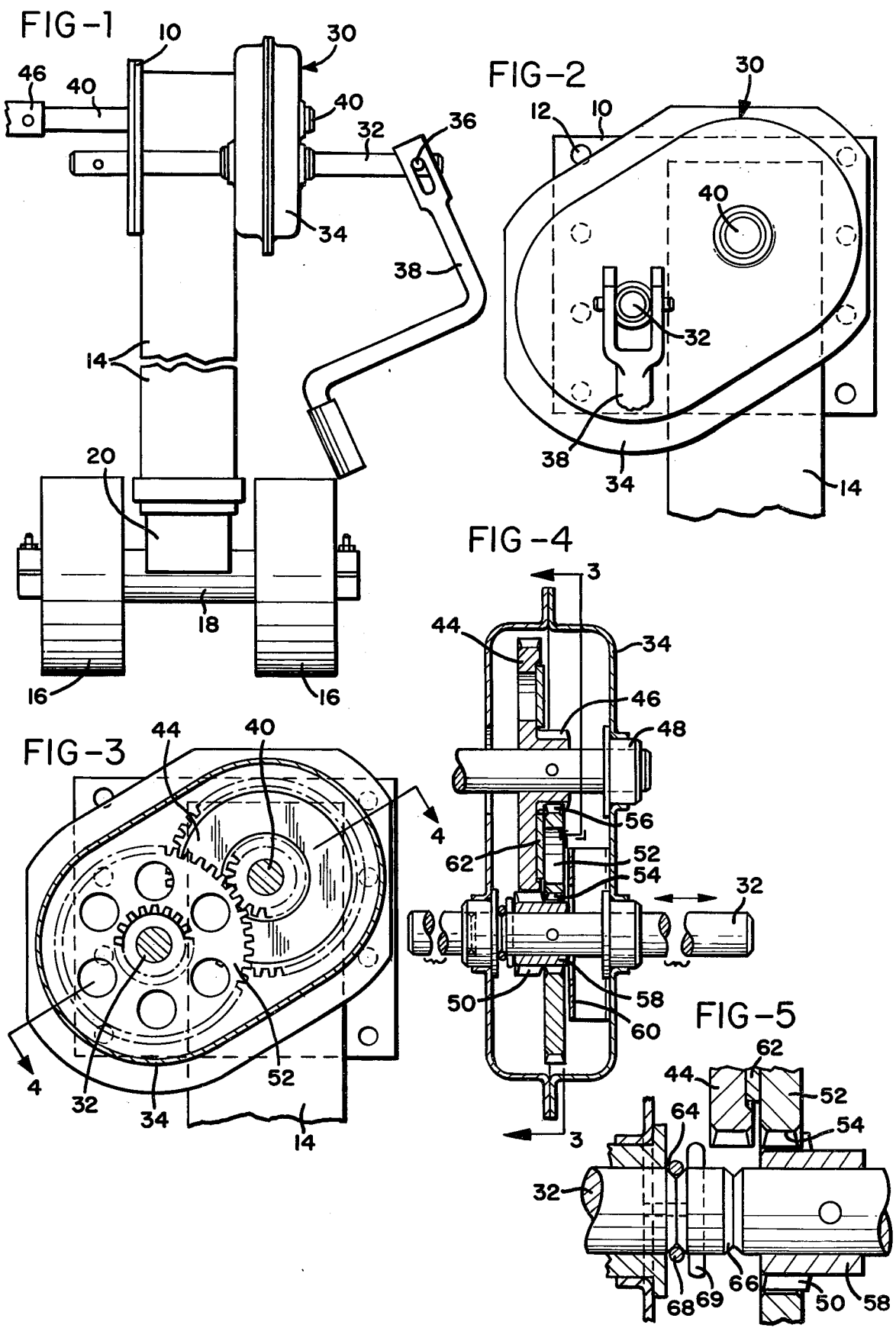

SPEED REDUCTION MECHANISM FOR SEMI-TRAILER LANDING GEAR

BACKGROUND OF THE INVENTION

1. Field of the Invention

The present invention relates to landing gear mechanisms for semi-trailers and more particularly, to a mechanism for providing two speed ratios between the manually rotated drive shaft and the driven shaft which engages the raising and lowering mechanism for the landing gear.

2. Prior Art

It is common in landing gear for semi-trailers to provide a two speed selectable gear ratio between the drive shaft which is rotated by a manually operated crank and the driven shaft which operates the raising and lowering mechanism of the landing gear. This permits the landing gear to be quickly lowered to the ground and then more slowly extended in order to carefully lift the semi-trailer off of the tractor without damaging either. The provision of the two speed ratios is usually accomplished by having the drive shaft axially shiftable and supporting both a large diameter and a small diameter gear which can be shifted into engagement with corresponding small and large diameter gears on the driven shaft. This allows the driven shaft to be rotated at two substantially different speed ratios from the speed of rotation of the drive shaft.

An example of such mechanisms is disclosed for example in U.S. Pat. No. 3,892,141 which is assigned to the common assignee of the present invention. Since all of the gears are fixed to their respective shafts, it is necessary to provide a space between one of the pairs of gears on a shaft in order that the large gear on the other shaft will not be in engagement with its respective pinion gear on the first shaft when the other pair of gears are in engagement. This necessary spacing between the gears therefore requires a greater axial movement of the drive shaft when shifting from one gear ratio to another, and thus also requires a greater width of housing, than would be necessary if it were possible to have both pairs of gears resting immediately adjacent one another on their respective drive shafts.

SUMMARY OF THE INVENTION

The present invention overcomes the above described difficulties and disadvantages associated with such prior art devices by providing a geared speed reduction crank mechanism which permits the pairs of gears on each shaft to be positioned substantially immediately adjacent one another and thus reduce the axial travel of the drive shaft necessary to change speed ratios and thus reduce the width of the housing. It includes a support housing, a pair of vertically spaced horizontally disposed shafts mounted for rotation in the housing, one of the shafts having an end portion extending outwardly from the housing and having a manual crank secured thereto and the other of the shaft's engaging means for raising and lowering the landing gear.

First and second gears are secured to the driven shaft and a third gear is secured to the drive shaft and is engageable with the first gear on the driven shaft. A fourth gear having both internal and external teeth is mounted for independent rotation on the drive shaft with the external teeth being engageable with the second gear and the internal teeth being engageable with the third gear, also supported on the drive shaft. Means is provided for maintaining the fourth gear in substantially laterally fixed position. The drive shaft is axially movable between a position in which the third gear is in driving engagement with the first gear while the fourth gear is free to rotate and a position in which the third gear drivingly engages the fourth gear and the fourth gear drivingly engages the second gear which is supported on the driven shaft.

The means for mounting the fourth gear for independent rotation on the drive shaft preferably includes a cylindrical spacer secured to the drive shaft adjacent the third gear and having its outside diameter slightly less than the inside diameter of the internal teeth on the fourth gear, so that the fourth gear remains substantially concentrically positioned on the drive shaft while free to rotate, and will thus be in substantial alignment with the gear teeth on the third gear when the drive shaft is axially shifted.

In this configuration it is desirable to have the diameters of the gears such that the speed of rotation of the driven shaft is greater than the speed of rotation of the drive shaft when the third gear is in engagement with the internal teeth of the fourth gear and to have the speed of rotation of the driven shaft less than the speed of rotation of the drive shaft when the third gear is in engagement with the first gear.

BRIEF DESCRIPTION OF THE DRAWINGS

FIG. 1 is a front elevational view of one half of a landing gear assembly for a semi-trailer, illustrating the housing and the drive shaft and driven shaft of the preferred embodiment of the present invention;

FIG. 2 is a side view of the housing of the speed reduction mechanism of the present invention illustrating the relative positions of the drive shaft and driven shaft;

FIG. 3 is a cross sectional view along line 3—3 of FIG. 4;

FIG. 4 is a cross sectional view along line 4—4 of FIG. 3; and

FIG. 5 is an enlarged cross sectional view of the drive shaft and spring detent mechanism which holds the drive shaft in one of two axially shiftable positions for proper engagement between the sets of gears on the drive and driven shaft.

DETAILED DESCRIPTION OF THE PREFERRED EMBODIMENT

The landing gear to which the present invention pertains is secured to the frame structure of a conventional semi-trailer by means of a bolting plate 10 which is secured by a plurality of bolts extending through the holes 12. A hollow rectangular cross section housing 14 is welded to the bolt plate 10 and extends downwardly therefrom to support the wheels 16 through the axial housing 18. Contained within housing 14 is a mechanism (not shown) which supports and extends the telescoping extension 20 in the bottom of the housing 14, so that the wheels 16 can be raised or lowered from the ground and when in engagement with the ground can cause the semi-trailer to be lifted off of the tractor so the two can be separated. The mechanism contained within the housing 14 for causing telescoping movement of extension 20 forms no part of the present invention, although it is driven thereby in the manner illustrated and described in the above referred to commonly assigned patent which is incorporated herein by reference thereto.

The gear speed reduction mechanism 30 of the present invention is secured to the opposite side of housing 14 from the plate 10 and has a drive shaft 32 which extends from both sides of the housing 34. Secured by a pin 36 to the outer end of drive shaft 32 is a manual crank arm 38. It is to be noted that the reason for having the drive shaft 32 extend outwardly from both sides of the housing 34 is in order to permit the crank mechanism 30 to be secured to either the right or left hand side of the landing gear assembly and thus permit operation of the landing gear from the right or left hand side of the semi-trailer, as desired.

The driven shaft 40 extends through the landing gear housing 14 and the plate 10 a sufficient distance that a coupling member 46 can be pinned or otherwise secured thereto. Coupling member 46 is a long bar which extends across the width of the semi-trailer in order to transfer the rotation of driven shaft 40 to the opposite landing gear (not shown) positioned on the other side of the semi-trailer and which has the same telescoping mechanism as in housing 14.

Referring to the internal mechanism of the gear speed reduction mechanism 30 as shown in FIGS. 3 and 4, a first gear 44 is secured to driven shaft 40 for rotation therewith within housing 34 and a second gear 46 is integrally formed therewith and thus also is secured for rotation with driven shaft 40. Shaft 40 has its outer end portion mounted in bearing member 48 in order to provide freedom of rotation thereof.

A third gear 50 is secured to drive shaft 32 for rotation therewith. A fourth gear 52 having both internal teeth 54 and external teeth 56 is mounted for independent rotation on a cylindrical spacer portion 58 formed as an extension of gear 50. Cylindrical spacer portion 58 is of slightly smaller diameter than the internal diameter of teeth 54 and thus permits the fourth gear 52 to rotate freely about the spacer portion 58 while being maintained substantially concentric with the drive shaft 52.

Third gear 50 is meshingly engageable with first gear 44 and the internal teeth 54 on the fourth gear 52. The fourth gear 52 is maintained in a substantially laterally fixed position relative to the housing, by a retainer member 60 secured to the inside of housing 34 on one side of the fourth gear 52 and by an annular spacer member 62 secured to the side of first gear 44 for rotation therewith. The separation between annular member 62 and retainer member 60 is slightly larger than the width of fourth gear 52 and allows the fourth gear to float laterally a small amount so that it is not always in engagement with the retainer member and annular member in order to reduce friction therebetween.

Drive shaft 32 is axially movable as shown in FIGS. 4 and 5, between a position in which third gear 50 is in driving engagement with first gear 44 and a position in which gear 50 is in driving engagement with the internal teeth 54 of fourth gear 52. In order to assist in maintaining drive shaft 32 in proper alignment with either the first or fourth gears during operation, a pair of annular grooves 64 and 66 are provided on drive shaft 32. The grooves are engageable with a spring clip 68 held in place by a retainer 69 along the inside surface of housing 34 in a manner such as referred to in the above mentioned commonly assigned patent. Grooves 64 and 66 are so positioned axially along drive shaft 32 that when third gear 50 is in alignment with first gear 44 the spring clip will be in groove 66 and when the third gear 50 is engaged with fourth gear 52 spring clip 68 will be positioned in groove 64; the latter position being illustrated in FIG. 5 in enlarged proportions from that shown in FIG. 4. The spring clip 68 is so designed that it easily yields upon manual application of axial force to drive shaft 32 to permit the operator to select his desired speed ratio. The clip 68 and its retainer 69 are preferably made according to the teachings of U.S. Pat. No. 3,892,141.

In operation, the operator would normally select the high speed ratio when the landing gear is off of the ground and is initially being lowered, in order to permit the wheels 16 to be quickly lowered to the ground. In the preferred embodiment this is accomplished by engaging the third gear 50 with the internal teeth of fourth gear 52 by pulling drive shaft 32 to the right as shown in FIG. 4. This causes the fourth gear to be driven upon rotation of drive shaft 32 and which in turn drives gear 46 to rotate the driven shaft 40 at a higher speed of rotation than drive shaft 32. Once the wheels are in engagement with the ground the operator then moves shaft 32 to the left as illustrated in FIG. 4 so that third gear 50 will engage first gear 44. The speed ratio is then changed so that driven shaft 40 rotates much slower than drive shaft 32 and thus increases the leverage which the operator can apply in order to lift the semi-trailer off of its coupling to the tractor.

It is to be noted the external teeth 56 of fourth gear 52 are constantly engaged with second gear 46. This causes rotation of fourth gear 52 when third gear 50 is in engagement with first gear 44. It is therefore necessary to properly align the internal and external gear teeth on gear 52 such that the teeth on third gear 50 will be aligned with internal teeth 54 as well as the teeth on gear 44 in order that gear 50 can be moved back and forth into engagement with either the first or fourth gears.

It is also to be noted that when gear 50 is in engagement with internal teeth 54 of gear 52, the teeth are in engagement around the entire periphery of gear 50, much like a simple splined shaft. Unlike a splined shaft and mating part, however, it is necessary to have the teeth of gear 50 generated as gear teeth since they must engage the teeth of gear 44 in a conventional gear driving manner. It is also preferable to have the internal teeth 54 of gear 52 generated as an involute spline, although it is not essential since these teeth need not act as conventional gear teeth but merely mate in relative fixed position with the teeth on gear 50.

While the form of apparatus herein described constitutes a preferred embodiment of the invention, it is to be understood that the invention is not limited to this precise form of apparatus, and that changes may be made therein without departing from the scope of the invention.

We claim:

1. In a geared speed reduction crank mechanism for a semi-trailer landing gear, the improvement comprising:
   a support housing;
   a pair of parallel vertically spaced horizontally disposed shafts mounted for rotation in said housing, one of said shafts having an end portion extending outwardly from said housing and the other of said shafts engaging means for raising and lowering said landing gear;
   crank means secured to said end portion of said one shaft for causing rotation thereof;

first and second gears secured to said other of said shafts;

a third gear secured to said one of said shafts and engageable with said first gear;

a fourth gear having internal and external gear teeth and mounted for independent rotation on said one of said shafts, said external teeth being engageable with said second gear and said internal teeth being engageable with said third gear;

means maintaining said fourth gear in substantially laterally fixed position; and said one shaft being axially movable between a position in which said third gear is in driving engagement with said first gear while said fourth gear is free to rotate and a position in which said third gear drivingly engages said fourth gear and said fourth gear drivingly engages said second gear.

2. A mechanism as defined in claim 1 wherein means for mounting said fourth gear for independent rotation on said one shaft includes a cylindrical spacer member secured to said one shaft adjacent said third gear and having an outside diameter slightly less than the inside diameter of said internal teeth on said fourth gear so that said fourth gear remains substantially concentrically positioned on said one shaft while free to rotate.

3. A mechanism as defined in claim 1 wherein the diameters of said gears are such that the speed of rotation of said other shaft is greater than said one shaft when said third gear is in engagement with said fourth gear and the speed of rotation of said other shaft is less than the speed of rotation of said one shaft when said third gear is in engagement with said first gear.

4. A mechanism as defined in claim 1 wherein means are provided for releasably holding said one shaft in either of said axially movable positions.

5. A two-speed gear mechanism for a semi-trailer landing gear, comprising a housing, a drive shaft rotatably mounted in said housing, a driven shaft rotatably mounted in said housing in laterally offset relation to said drive shaft, a spur gear member mounted on said drive shaft and having a toothed portion and an axially adjacent cylindrical portion, a driven output gear mounted on said output shaft and having a first gear portion thereon of a diameter proportioned to engage said spur gear and having a second gear portion of a smaller diameter adjacent to said first portion, and an internally-externally toothed gear positioned in annular relation to said drive shaft and having its external teeth in constant running engagement with said second gear portion and having its internal teeth proportioned to mate in a spline like fashion with the teeth of said spur gear, and said spur gear and drive shaft being movable axially between two selected positions, a first of said positions providing for engagement of said spur gear with said first gear portion while said internal teeth ride on said cylindrical portion and a second said position providing splined engagement with said internal teeth so that said spur gear and said internally-externally toothed gear rotates in unison to drive said output shaft through the external teeth thereof and said second gear portion of said output gear.

* * * * *